(12) United States Patent
Lang et al.

(10) Patent No.: US 12,597,823 B2
(45) Date of Patent: Apr. 7, 2026

(54) ROTOR AND METHOD FOR PRODUCING A ROTOR

(71) Applicant: Bayerische Motoren Werke Aktiengesellschaft, Munich (DE)

(72) Inventors: Markus Lang, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 289 days.

(21) Appl. No.: 18/281,449

(22) PCT Filed: Apr. 11, 2022

(86) PCT No.: PCT/EP2022/059578
§ 371 (c)(1),
(2) Date: Sep. 11, 2023

(87) PCT Pub. No.: WO2022/223339
PCT Pub. Date: Oct. 27, 2022

(65) Prior Publication Data
US 2024/0162775 A1     May 16, 2024

(30) Foreign Application Priority Data
Apr. 20, 2021     (DE) ..................... 10 2021 109 899.8

(51) Int. Cl.
*H02K 3/52*     (2006.01)
*H02K 3/30*     (2006.01)
(Continued)

(52) U.S. Cl.
CPC ............... *H02K 3/527* (2013.01); *H02K 3/30* (2013.01); *H02K 3/325* (2013.01); *H02K 15/095* (2013.01); *H02K 15/12* (2013.01); *H02K 2215/00* (2021.08)

(58) Field of Classification Search
CPC .......... H02K 3/30; H02K 3/325; H02K 3/527; H02K 15/095; H02K 15/12; H02K 2215/00
(Continued)

(56) References Cited

U.S. PATENT DOCUMENTS 4,321,013 A * 3/1982 Schwarz ................. B64C 27/32
                                                    416/241 A
4,561,306 A * 12/1985 Marino ................. F01D 21/045
                                                    73/431
(Continued)

FOREIGN PATENT DOCUMENTS

DE        42 37 079 A1        5/1994
DE        196 35 295 A1      10/1997
(Continued)

OTHER PUBLICATIONS

Gottfried et al., English Machine Translation of WO91/12133 (Year: 1991).*
(Continued)

*Primary Examiner* — Rashad H Johnson
(74) *Attorney, Agent, or Firm* — Crowell & Moring LLP

(57)        ABSTRACT
A rotor, in particular for a current-excited electric machine, comprising a winding, wherein on or against the winding is arranged a support element made of a composite material comprising matrix material and fiber material.

16 Claims, 1 Drawing Sheet

(51) Int. Cl.
 *H02K 3/32*     (2006.01)
 *H02K 15/095*    (2006.01)
 *H02K 15/12*     (2006.01)

(58) Field of Classification Search
 USPC ........................................................ 310/179
 See application file for complete search history.

(56)       References Cited

U.S. PATENT DOCUMENTS

| | | | |
|---|---|---|---|
| 4,675,001 A * | 6/1987 | Johanson .............. | B04B 5/0414 |
| | | | 494/85 |
| 2016/0329123 A1 | 11/2016 | Mabuchi et al. | |
| 2018/0076680 A1* | 3/2018 | Rienecker .............. | H02K 3/487 |
| 2020/0336035 A1 | 10/2020 | Brenner et al. | |
| 2021/0399606 A1 | 12/2021 | Schmezer | |
| 2024/0195245 A1* | 6/2024 | Odling ................... | H02K 21/24 |

FOREIGN PATENT DOCUMENTS

| | | |
|---|---|---|
| DE | 20 2009 015 119 U1 | 4/2011 |
| DE | 10 2015 213 887 A1 | 1/2017 |
| DE | 10 2016 205 813 A1 | 10/2017 |
| DE | 10 2018 001 015 A1 | 8/2019 |
| DE | 10 2019 215 717 A1 | 4/2021 |
| EP | 1 296 438 A2 | 3/2003 |
| JP | 52-122801 A | 10/1977 |
| JP | 7-245017 A | 9/1995 |
| WO | WO 91/12133 A1 | 8/1991 |
| WO | WO 2019/121280 A1 | 6/2019 |

OTHER PUBLICATIONS

International Search Report (PCT/ISA/210) issued in PCT Application No. PCT/EP2022/059578 dated Aug. 26, 2022 with English translation (5 pages).
German-language Written Opinion (PCT/ISA/237) issued in PCT Application No. PCT/EP2022/059578 dated Aug. 26, 2022 with English translation (9 pages).
German-language Search Report issued in German Application No. 10 2021 109 899.8 dated Dec. 15, 2021 with partial English translation (11 pages).

* cited by examiner

ROTOR AND METHOD FOR PRODUCING A ROTOR

FIELD

The present invention relates to a rotor, in particular for a current-excited or separately excited electric machine, and to a method for producing a rotor.

BACKGROUND AND SUMMARY

Rotors for, for example, separately excited synchronous machines are exposed to extremely high loadings during operation. Such rotors must thus meet high requirements with regard to centrifugal force and temperature. In particular, rotors of current-excited machines that have copper wire wound around them therefore often require mechanical stabilization of the windings. In this context, DE 10 2016 205 813 A1 proposes a method for producing a rotor, wherein a rotor laminated core with the wound rotor windings is inserted into a mold and is overmolded under high pressure with a plastics compound. Although this makes it possible, in principle, to obtain good results, it has been shown that cracks can form in such potting compounds, which may not be unproblematic.

It is therefore an object of the present invention to specify a rotor and a method for producing a rotor, wherein the aforementioned problems are eliminated and a rotor which withstands the highest loadings is specified.

This object is achieved by means of a rotor as disclosed herein and by means of a method as also disclosed herein. Further advantages and features emerge from the description and the attached figures.

According to certain embodiments of the invention, a rotor, in particular for a current-excited electric machine, in particular a synchronous machine, comprises a winding, wherein a support element composed of a composite material, comprising matrix material and fiber material, is arranged on or against the winding. Expediently, the composite material comprises at least two materials, in the present case in particular the matrix material and the fiber material. In addition to the two aforementioned materials, further components may form part of the composite material as required. A suitable design of the composite material allows the stiffness and the strength of the support element to be designed as required. Particularly advantageously, very low rotor weights can be realized with such a support element.

According to a preferred embodiment, the rotor comprises a multiplicity of rotor laminations which are stacked to form a rotor laminated core. The rotor laminations or the rotor laminated core has, distributed in a circumferential direction, rotor teeth and (winding) grooves formed therebetween. According to one embodiment, in the present case a rotor around which copper wire has been wound to form the winding or windings is concerned. Expediently, in the present case the support element bears directly against the winding or against an outermost layer or ply of the winding. The composite material expediently exhibits the property that it can be shaped in a first state, and therefore it can be adapted to the shape of the winding. Only after a drying and/or curing process does it achieve its final strength, it then forming a solid support element which preferably completely or at least substantially envelops the winding, in particular both in the region of the grooves and in the region of the winding heads, that is to say at the end-side regions of the rotor.

Particularly preferably, the fiber material is wound around the winding.

According to a preferred embodiment, the support element is formed by winding the fiber material comprising the matrix material around the winding. According to a preferred embodiment, the fiber material is present in the form preferably of a flexible, thread-like, cord-like or linear fiber. This enables winding around the winding. Consequently, optimal abutment against the winding can be achieved, and the support element thus follows the shape of the winding exactly and can mechanically stabilize the latter in a particularly satisfactory manner. It is thus possible to generate a ply of fiber material which is a few to several millimeters thick, depending on the size of the rotor and the mechanical requirements. Typical thicknesses lie in a range from 1 to 10 mm, preferably in a range from 2 to 6 mm.

According to a preferred embodiment, the fiber material is a reinforcing fiber, in particular a glass fiber, preferably a glass fiber which is pre-impregnated (with the matrix material). For example the use of an E-glass fiber has proven to be particularly advantageous in this context. The (reinforcing) fiber which is advantageously pre-impregnated can be cured by way of a curing operation, for example in an oven, to generate a solid fiber-plastics composite body.

According to one embodiment, as an alternative or in addition, the matrix material is added in a separate method step. According to one embodiment, the support element has a first region and a second region, wherein the fiber material reinforces the matrix material in the first region, and wherein the matrix material is not reinforced with the fiber material in the second region. In this case, the first region is preferably the region which is formed or arranged directly on the winding. According to one embodiment, this region is formed by the winding around of untreated/unfiltered fiber material. Subsequently, the first region is overmolded or encapsulated to generate/form the second region, wherein here the first region is also advantageously infiltrated with matrix material. As an alternative, the first region may also have already been generated with a fiber material comprising matrix material, for example has thus already been infiltrated with said matrix material.

During the aforementioned overmolding or encapsulating, a layer or ply which forms the second region can be formed on the first region. The thickness of said second region may be several millimeters, preferably 1 to 15 mm. Typically, the thickness of the second region is greater than the thickness of the first region. As an alternative, the overmolding or encapsulating may be conducted in such a way that the (rotor) groove is completely filled with the matrix material.

According to a preferred embodiment, the rotor comprises groove covers or groove wedges which are arranged in each case between two rotor teeth and which close the space between the rotor teeth, that is to say the (winding) groove, in a radial direction. According to one embodiment, during the overmolding or encapsulating with matrix material, the groove is filled up to the groove covers or groove wedges. According to one embodiment, the groove covers or groove wedges have separating elements which are designed to divide a groove into two chambers. This can entail advantages, inter alia, for the overmolding/encapsulating.

Expediently, the fiber material is of thread-like, cord-like or linear form and is oriented along or parallel to the conductor elements of the winding. According to a preferred embodiment, the conductor elements are copper wire, preferably with round cross section.

According to one embodiment, the matrix material is an insulation material. In particular, the matrix material is designed to provide electrically insulating properties.

Expediently, the support element forms a contiguous layer which envelops the winding. The layer advantageously completely encases the winding or the windings. In particular, the winding is encased as completely as possible both in the region of the winding grooves and in the region of the winding heads and thus is securely fixed. In preferred embodiments, the thickness of the "layer" is approximately 1 to 10 mm, in particular approximately 2 to 8 mm and preferably approximately 3 to 6 mm.

According to one embodiment, the rotor, comprising the support element, is overmolded or encapsulated with potting compound. It may thus be advantageous to operate with a further potting compound in addition to the matrix material.

Preferred methods for the overmolding/encapsulating are for example injection molding or potting methods, such as (vacuum) pressure gelation. Materials for the matrix material and the potting compound are preferably thermoplastics and thermosets.

The decoupling of the potting compound from the winding by way of the support element makes it possible to effectively reduce or even prevent the formation of cracks within the potting compound during operation.

The overmolding or encapsulating with potting compound is expedient in particular if the support element comprises only the or a first region.

In conjunction with the aforementioned overmolding or encapsulating with potting compound, the support element also offers the advantage that not all the cavities have to be filled with potting compound. The support element shields the winding located thereunder. It is thus by all means possible for cavities to still be present there, which are not or do not have to be filled with potting compound. As a result, a weight-optimized rotor can be realized.

According to one embodiment, an enveloping element is arranged on the support element at least in certain regions. According to one embodiment, such an enveloping element is in the form of a termination sheet which is provided so as to generate a desired or necessary surface quality or finish. According to one embodiment, said enveloping element may, for example, be used to optimize the encapsulating or overmolding with potting compound in a targeted manner, for example by virtue of such an enveloping element being designed to guide the potting compound during the overmolding or encapsulating, etc.

The invention is also directed to a method for producing a rotor, comprising the steps:

winding a rotor body to form a winding;
winding fiber material around the winding to form a support element, wherein the support element comprises the fiber material and matrix material;
applying the matrix material during or after the winding-around with the fiber material.

The winding-around with the fiber material entails the advantage, in particular, that the already generated winding can be even further compacted.

According to a preferred embodiment, the winding-around is effected with fiber material comprising the matrix material. Advantageously, a reinforcing fiber, such as a glass fiber, which has already been infiltrated with matrix material is used.

Expediently, in a first step, all the necessary steps are performed in order for the rotor body, comprising a multiplicity of rotor laminations, cf. also the aforementioned rotor laminated core, to be able to be wound with preferably copper wires. In a second step, the rotor laminated core is wound with the desired number of rotor windings. In a next assembly step, the last ply of copper windings is wound with a preferably pre-impregnated E-glass fiber. As an optional step, a termination sheet, cf. the aforementioned enveloping element, may be arranged on the glass fiber layer in order to generate a desired or necessary surface quality.

According to one embodiment, the method comprises the step:

applying the matrix material to the already wound, in particular untreated, fiber material.

Particularly if a support element comprising first and second regions is intended to be generated, this approach is advantageous. It should be mentioned at this point that the advantages mentioned in conjunction with the rotor apply to the method, and vice versa.

Expediently, the method further comprises the step:

conditioning the rotor to form a contiguous support element ply or layer.

In this regard, according to one embodiment, the completely wound rotor is positioned in a suitable conditioning device, such as an oven, in order for the for example pre-impregnated reinforcing fibers/glass fibers to be able to be cured, for example by heating, to form a component.

The conditioning may comprise both heating and cooling of the rotor. The conditioning may be intended to for example set the initially solid matrix material into a liquid state in order for a contiguous support element to be able to be generated. As an alternative, the matrix material is soft enough during the winding-around operation that a contiguous layer, which for example only needs to be solidified, can already be generated during the winding-around operation. In this regard, conditioning, for example by heating or cooling, may also be necessary. The conditioning may also be understood to mean an adaptation of an ambient pressure or to mean an adaptation of an atmosphere or to mean an adaptation of the composition thereof.

According to a preferred embodiment, the method comprises the step:

compacting the winding when the fiber material is being wound around.

Owing to its high tensile strength, the fiber material, which is preferably a reinforcing fiber, such as a glass fiber, enables a particularly effective stabilization of the winding, in particular by the aforementioned compacting. The winding itself is wound under a preload during the winding process. The winding-around with the fiber material makes it possible to not only maintain and stabilize this preload but also increase it further.

It should be mentioned at this point that the fiber material is preferably present, as mentioned, in the form of a thread-like, cord-like or linear material. As an alternative, the fiber material may also be present in the form, for example, of a band-like or strip-like material. According to one embodiment, woven fabric or strips of laid scrim may also be used for the winding-around operation, with the result that the fibers not only have an orientation along the conductor elements, in particular the copper wires, but also obliquely and/or transversely with respect thereto. This may possibly even further optimize the mechanical properties of the support element.

Further advantages and features will emerge from the following embodiment of a rotor with reference to the appended figures.

DETAILED DESCRIPTION

Figure 1:
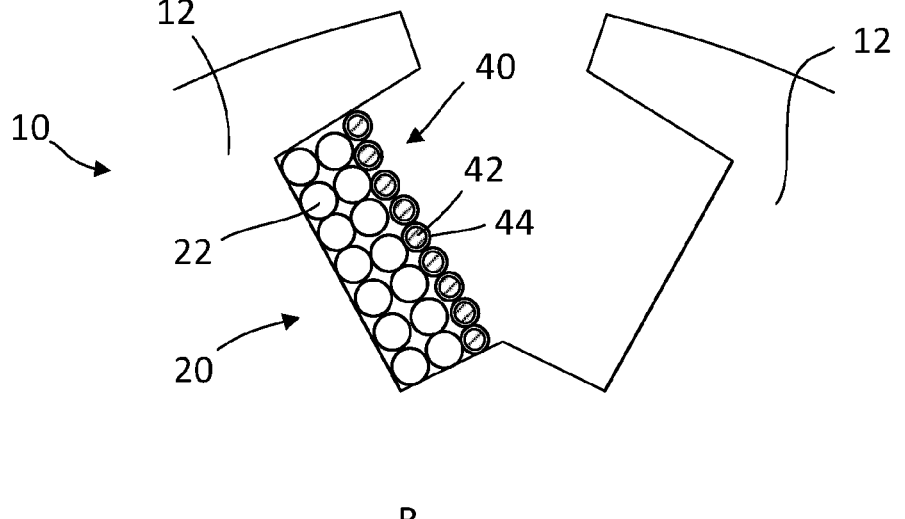
FIG. 1 shows a schematic sectional view of a rotor for the purpose of illustrating the function of the support element.

FIG. 1 shows a schematic view of a cross section through a rotor 10, said cross section extending along a rotor axis R. Two rotor teeth 12 which lie next to one another and which form a winding groove or rotor groove therebetween are depicted. It is schematically illustrated that a winding 20, comprising a multiplicity of conductor elements, such as copper wires, is wound around the left-hand rotor tooth 12 to produce and form the winding 20. A support element 40 is formed/arranged on the winding 20. The support element 40 is preferably generated by fiber material 42 being wound around the winding 20. Expediently, said fiber material has already been provided or infiltrated with matrix material 44. In the present case, it is depicted that the fiber material 42 is enveloped by matrix material 44 in the present case. The fact that the right-hand rotor tooth 12 is not provided with a winding or a support element serves merely for improved clarity of the illustration. Winding the fiber material 42 (in addition to matrix material 44) around the winding 20 expediently allows the winding 20 to be compacted, as a result of which the mechanical stability during operation can be increased considerably. The preferably thread-like fiber material 42 adapts to an outer contour of the winding 20 in an ideal manner, as a result of which particularly good stabilization of the winding 20 can also be achieved. A rotor, as depicted in FIG. 1, may additionally be surrounded, in particular for example sprayed, sprinkled, overmolded or encapsulated, with potting compound after the arrangement of the support element 40. In this regard, for stabilization, the potting compound expediently does not have to penetrate into the winding 20 itself. Expediently, cavities, voids or gaps etc. can remain within the winding, which can result in a considerable weight saving. FIG. 1 shows a schematic view of a support element 40 which has not yet been completed. In particular, no contiguous layer has yet been formed, cf. in this regard FIG. 2.

Figure 2:
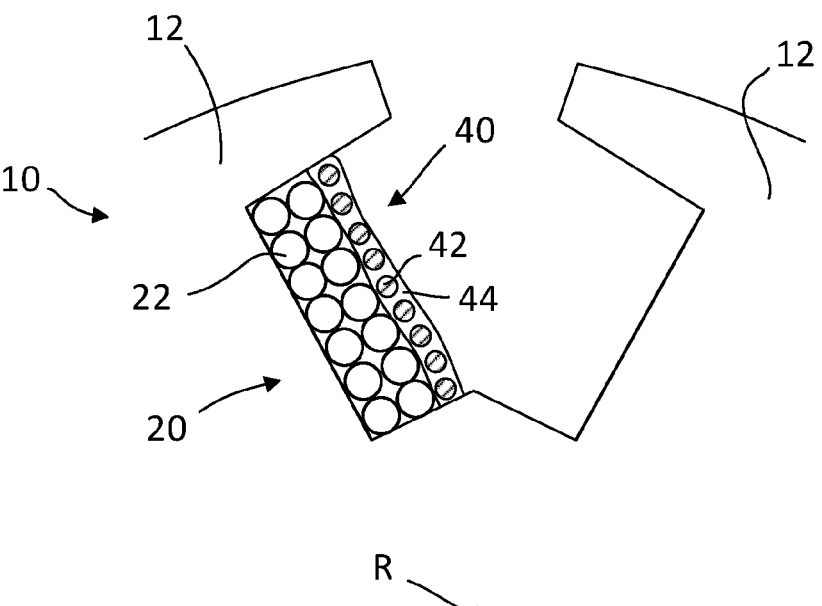
FIG. 2 shows the depiction known from FIG. 1, the support element here forming a contiguous layer.

FIG. 2 shows the depiction known substantially from FIG. 1. In the present case, the support element 40 is now in the form of a contiguous fiber-plastics composite body. In this regard, the matrix material 44 provided by way of the fiber material 42 has blended. This may have already been realized automatically during the winding-around operation if the matrix material 44 is not solid from the outset. As an alternative, the blending may be effected by heating the rotor 10. The heat may be supplied externally, for example by way of a heating device, or from the inside as it were, by way of a current flow which is generated in the winding 20. According to an alternative embodiment, the matrix material may also fill the space between the two rotor teeth 12, entirely or at least in certain regions. According to one embodiment, the aforementioned "space" is closed in the radial direction by way of a groove closing wedge. As a further alternative, a support element 40 as depicted in FIG. 2 or in FIG. 1 may, as already mentioned, be overmolded or encapsulated with potting compound, wherein here the aforementioned space is also completely filled with potting compound.

LIST OF REFERENCE DESIGNATIONS

10 Rotor
12 Rotor tooth
20 Winding

22 Conductor element, copper wire
40 Support element
42 Fiber material
44 Matrix material
R Rotor axis

The invention claimed is:

1. A rotor for a current-excited electric machine comprising:
a winding, wherein a support element composed of a composite material, comprising matrix material and fiber material, is arranged on or against the winding,
wherein the fiber material is formed of a thread-like material with the thread-like material oriented along or parallel to conductor elements of the winding.

2. The rotor according to claim 1,
wherein individual threads of the thread-like material of the fiber material are wound around the winding.

3. The rotor according to claim 1,
wherein the fiber material is a reinforcing fiber.

4. The rotor according to claim 3,
wherein the fiber material is a pre-impregnated glass fiber.

5. The rotor according to claim 1,
wherein the support element has a first region and a second region,
wherein the fiber material reinforces the matrix material in the first region, and
wherein the matrix material is not reinforced with the fiber material in the second region.

6. The rotor according to claim 1,
wherein the matrix material is an insulation material.

7. The rotor according to claim 1,
wherein the support element is overmolded or encapsulated with potting compound.

8. The rotor according to claim 1,
wherein an enveloping element is arranged on the support element at least in certain regions.

9. A method for producing a rotor, comprising:
winding a rotor body to form a winding;
winding fiber material around the winding to form a support element, wherein the support element comprises the fiber material and matrix material; and
applying the matrix material during or after winding the fiber material around the winding.

10. The method according to claim 9, comprising:
winding the fiber material comprising the matrix material around the winding.

11. The method according to claim 9, comprising:
applying the matrix material to the already wound fiber material.

12. The method according to claim 11, comprising:
applying the matrix material to the already wound and untreated fiber material.

13. The method according to claim 9, comprising:
compacting the winding while the fiber material is being wound around.

14. The method according to claim 9, comprising:
orienting the fiber material along or parallel to conductor elements of the winding.

15. The method according to claim 9, comprising:
overmolding or encapsulating the support element with potting compound.

16. The method according to claim 9, comprising:
arranging an enveloping element on the support element at least in certain regions.

* * * * *